J. E. HARTSOOK.
DETACHABLE HUB.
APPLICATION FILED SEPT. 20, 1911.
1,033,170.
Patented July 23, 1912.
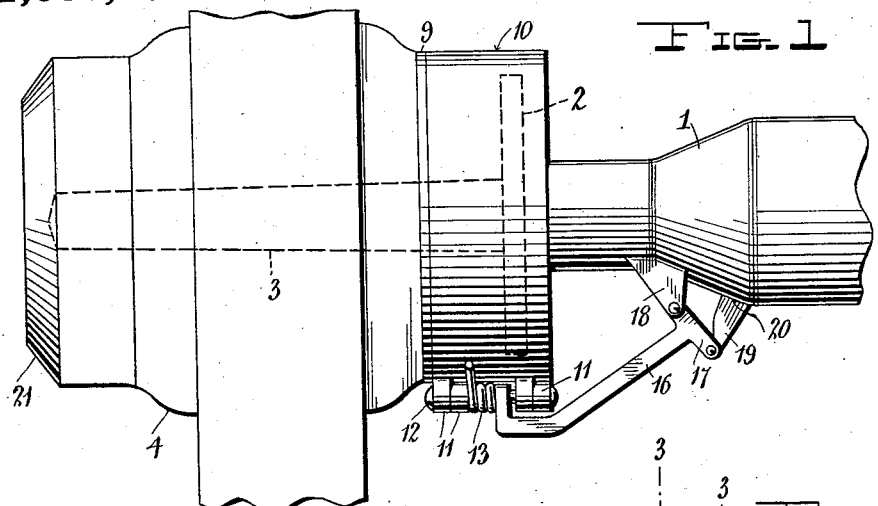
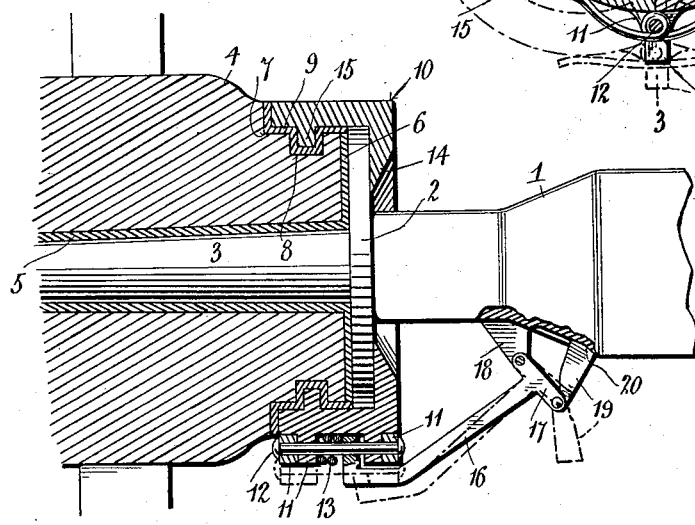
Witnesses
Inventor
J. E. Hartsook
By
Attorneys

UNITED STATES PATENT OFFICE.

JOHN E. HARTSOOK, OF NEVADA, MISSOURI.

DETACHABLE HUB.

1,033,170.  Specification of Letters Patent.  Patented July 23, 1912.

Application filed September 20, 1911. Serial No. 650,377.

*To all whom it may concern:*

Be it known that I, JOHN E. HARTSOOK, a citizen of the United States, residing at Nevada, in the county of Vernon, State of Missouri, have invented certain new and useful Improvements in Detachable Hubs; and I do hereby declare the following to be a full, clear, and exact description of the invention, such as will enable others skilled in the art to which it appertains to make and use the same.

My invention relates to new and useful improvements in vehicle wheels and an object of my invention is to provide a device by means of which the wheel may be secured upon the axle spindle without the use of the customary bolts. In the accomplishment of this object I provide the vehicle axle with a circumferential flange, the hub with a circumferential groove and coacting with this flange and groove I provide a sectional band adapted to be closed about the grooved end of the hub and about the flange of the axle thereby locking the two together. And a further object of my invention is therefore to provide means for supporting this band either in its operative position when closed about the hub or when removed therefrom.

With these and other objects, in view, my invention will be more fully described, illustrated in the accompanying drawings which show a preferred embodiment of my device and then specifically pointed out in the claim which is attached to and forms a part of this application.

In the drawings, Figure 1 is a side elevation showing the spindle end of a vehicle axle and a wheel hub secured thereto by means of my device. Fig. 2 is a transverse section taken through the locking band. Fig. 3 is a central longitudinal section on the line 3—3 of Fig. 2.

Referring more specifically to the drawings in which similar reference numerals designate corresponding parts throughout, the axle consists of a tapered portion 1 terminating in a circumferential flange 2 beyond which extends the customary form of spindle 3 with the exception that the end of the spindle does not extend beyond the hub and is not screw threaded.

The hub of the wheel which as a whole is designated by the numeral 4 is of the customary type and is provided with the customary journal box 5 and at its inner end with an annular wear plate 6 which when the hub is in position bears against the outer face of the flange 2.

As shown the inner end of the hub is reduced as at 7 and this reduced portion is provided with a circumferential channel or groove 8 and surrounding the reduced portion of the hub and extending into this channel is a bearing ring 9.

As shown the reduced portion of the hub is so proportioned that when this bearing ring is in place said portion is equal in diameter to the diameter of the flange portion of the axle.

As a means for detachably securing the hub upon the spindle I have provided a sectional band 10 consisting of two semi-circular members hinged to each other by means of integrally formed ears 11 and the pintle bolt 12, said hinge being also provided with a spring 13 for normally holding the sections in closed position. This band is provided upon its inner edge with an inwardly directed flange 14 adapted to engage against the inner face of the axle flange 2 and with an inwardly directed flange 15 adapted to be seated in the circumferential groove 8 of the hub. As will be readily seen by referring to Fig. 3 of the drawings this band when closed about the hub firmly locks it in place upon the spindle and at the same time acts as a sand cap for preventing all dirt from entering the bearings.

As a means for supporting the band I have provided a supporting arm 16 one end of which is provided with a laterally directed terminal adapted to be engaged by a pintle bolt 12 of the hinge whereby the arm is connected to the band and the other end of this arm is provided with a laterally directed head 17 one end of which is pivotably mounted between ears 18 carried by the axle. By this means the band is at all times connected to the vehicle and all danger of losing the same when the wheel is removed is prevented. Pivoted to the free end of the head portion 17 of this arm is a lock member 19 having a cam face 20 adapted to engage against the tapered face of the axle when the band is in position about the hub and to thus hold the arm 16 against downward motion, thereby supporting the band in place. This supporting structure together with the spring hinge of the band is sufficient to maintain the band in closed position about the hub and all other fastening means is therefore unnecessary. The outer end of the hub is provided with any suitable form of closure cap 21 which effectually prevents the entrance of dirt to the bearings from that end.

In operation the wheel is placed upon the axle in the customary manner, the locking band is then opened and passed upwardly about the reduced portion of the hub and when so positioned the spring of the hinge immediately closes the band about the same locking the wheel upon the spindle. The locking member 19 is then swung to bring its cam face into engagement with the tapered surface of the axle thereby locking the supporting arm 16 against movement and thus supporting the locking band irrespective of the force exerted by the spring hinge the spring of which therefore, need only be of sufficient strength to hold the band sections together against the jar of the vehicle.

From the foregoing description it will be apparent that I have provided an extremely simple and at the same time an efficient method of securing a vehicle wheel upon its axle without the employment of the customary nuts.

What I claim is:—

The combination with an axle having a circumferential flange and a wheel hub for said axle having its inner end reduced and provided with a circumferential groove, of a sectional band formed in equal sections, said sections being hinged to each other by a spring hinge, said sections being provided with inwardly directed flanges, one of said flanges being adapted to bear against the flange of the axle and the other to engage in the groove of the hub, and means for supporting said band in operative position, said means consisting of an arm one end of which is connected to the band and the other end of which is provided with a laterally directed head, one end of said head being pivotably secured to the axle, and a locking member pivoted to the other end of said head and having a cam face adapted to bear against the axle when the band is in operative position.

In testimony whereof, I affix my signature, in presence of two witnesses.

JOHN E. HARTSOOK.

Witnesses:
CHAS. E. GILBERT,
L. N. HAGOOD.

---

Copies of this patent may be obtained for five cents each, by addressing the "Commissioner of Patents, Washington, D. C."